United States Patent [19]

Lenz

[11] 4,017,979
[45] Apr. 19, 1977

[54] BEVEL GEAR SHIMMING GAGE

[75] Inventor: Herman N. Lenz, Lambertville, Mich.

[73] Assignee: Teledyne Industries, Inc., Los Angeles, Calif.

[22] Filed: Oct. 9, 1975

[21] Appl. No.: 620,925

[52] U.S. Cl. .......................... 33/174 R; 33/180 R; 74/417

[51] Int. Cl.² .......................................... G01B 3/00

[58] Field of Search ...... 33/185 R, 174 R, 179.5 R, 33/179.5 B, 180 R; 74/417, 423

[56] References Cited

UNITED STATES PATENTS 3,774,466  11/1973  Bhatia et al. ...................... 74/417

Primary Examiner—Richard E. Aegerter
Assistant Examiner—Willis Little
Attorney, Agent, or Firm—Gifford, Chandler, Sheridan & Sprinkle

[57] ABSTRACT

A bevel gear shimming gage is provided for determining the shim sizes for the bearings supporting the gears within a bevel gear housing. A first main housing abuts against a first bearing, a first bearing support abuts against a second bearing and a first gaging rod is received through registering apertures in the first bearing support and the first main housing and provides a means whereby the axial distance between a gaging rod reference point and a first main housing reference point may be determined. In addition, the gaging rod provides a means whereby the axial distance between reference points on the gaging rod and the bearing supports may be determined. Similarly, a second main housing abuts against a third bearing, a second bearing support abuts against a fourth bearing, while a second gaging rod is received through registering apertures in the second bearing support and the second main housing and provides a means whereby the distance between reference points associated between the second main housing and the second gaging rod and between the second gaging rod and the second bearing support may be readily determined. Once the above distances have been measured, simple computations then yield the required shim dimensions for each bearing.

8 Claims, 5 Drawing Figures

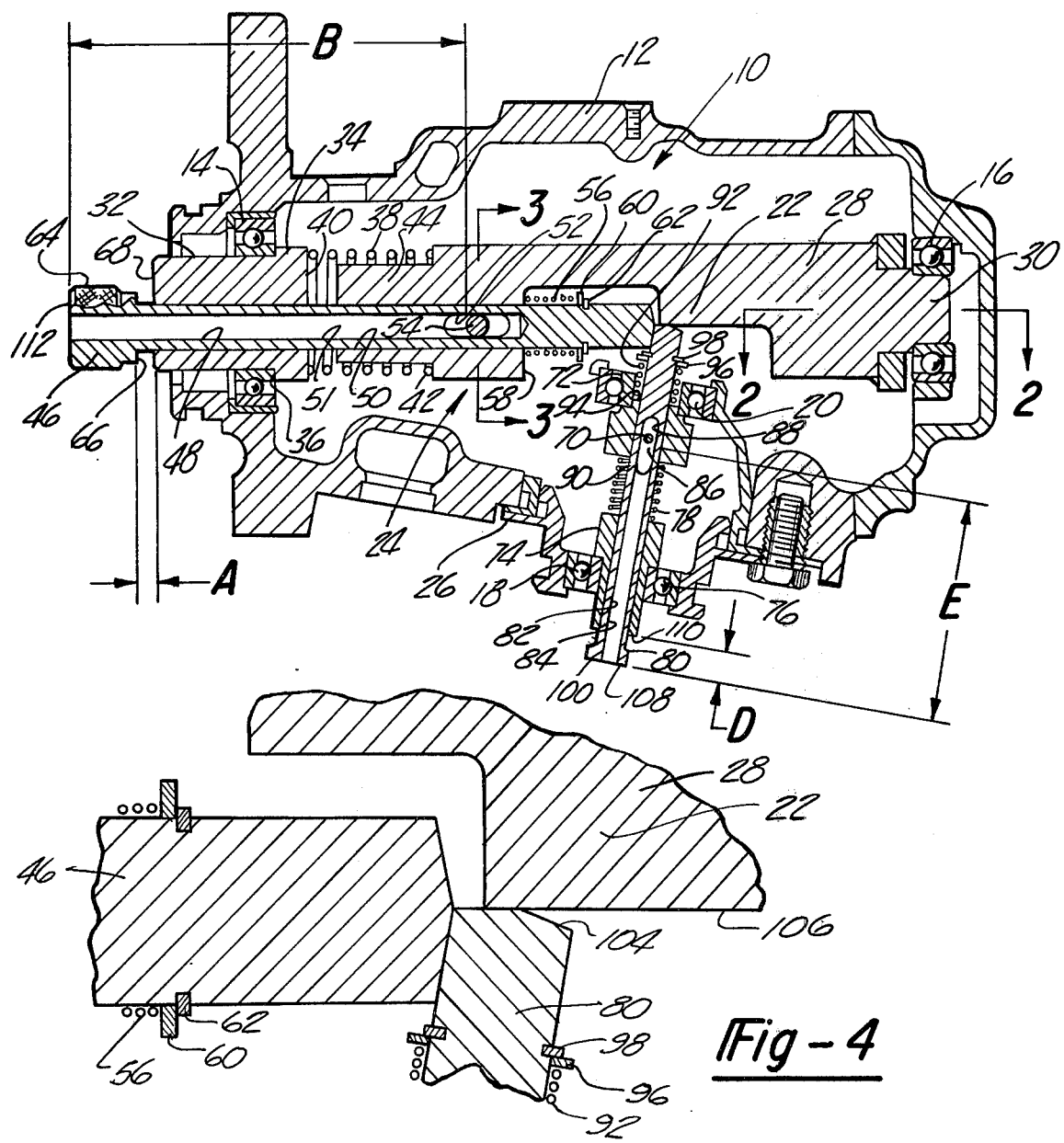

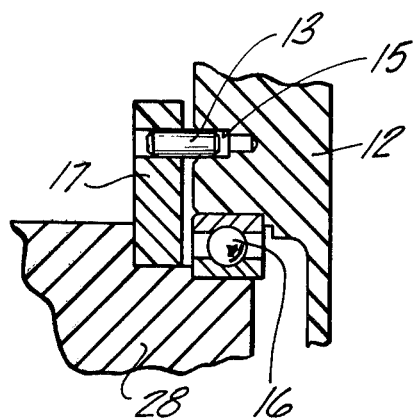
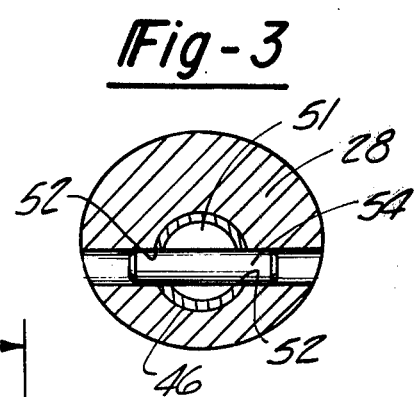
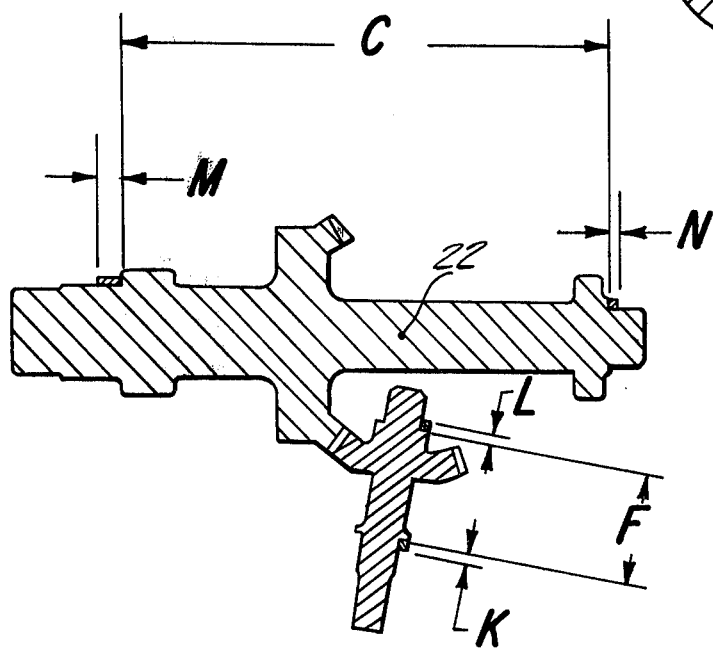

BEVEL GEAR SHIMMING GAGE

BACKGROUND OF THE INVENTION

1 Field of the Invention

The present invention relates generally to a shimming gage, and, more particularly, to a bevel gear shimming gage.

2. Description of the Prior Art

Cooperating bevel gears provide a unique arrangement whereby the axes of rotation for one shaft may be translated to any other intersecting desired axis of rotation. Consequently, bevel gear arrangements have enjoyed widespread acceptance in industry in general and are particularly commonly employed with high speed turbine engines.

Since the axes of rotation for the bevel gears usually intersect at an oblique angle, in practice it is necessary to provide shims, or spacers, around the bearings which carry the bevel gears in order to properly axially position the bevel gears. The use of shims compensates for manufacturing tolerances in the construction of the bevel gear and the bevel gear housing and, without the use of shims, the gear teeth engagement between the bevel gears will ordinarily mismatch and subject the bevel gears to excessive stress and mechanical wear and tear. Continued operation of mismatched bevel gears may result in bevel gear failure which is particularly disasterous at high speed bevel gear operation.

The previously known bevel gear shim sets have proved to be not only expensive in construction, but also awkward and time consuming in operation. Such sets have usually comprised three groups of multi-piece gages and three separate shim assemblies. A preliminary assembly utilizing a various number of loose gaging pieces is first assembled within the bevel gear housing to obtain the dimensions of the thrust side shims. This preliminary assembly is then dismantled and the thrust side shims are ground to the desired thickness and installed in the bevel gear housing. A second bevel gear shim assembly is then assembled within the bevel gear housing with the already ground thrust shim in order to determine the opposite end third shim. The third and final shim assembly is then constructed in the bevel gear housing with the already dimensioned thrust and third shim. The dimensions of the third and fourth shims are determined from the third bevel gear shim assembly and these shims must then be ground before final engine assembly can be completed.

Since each shim must be sequentially ground to size before the next shim dimension can be determined, the previously known bevel gear shim gages have proven to be time consuming in operation. For example, often four hours or more are required to determine and grind the four shims required in a single bevel gear arrangement. Moreover due to the multiple assemblies required with the previously known bevel gear shim gages, these gages have been not only awkward in operation but also expensive in construction.

SUMMARY OF THE PRESENT INVENTION

The bevel gear shim gage of the present invention obviates the above mentioned disadvantages of the previously known bevel gear shim gages by providing an apparatus whereby the dimensions of each of the four required shims may be determined from a single assembly in the bevel gear housing. The present invention provides a further advantage over the previously known shimming gages in that the shimming gage of the present invention is relatively inexpensive in constrution and comprises a relatively few number of compact components.

In brief, assuming a bevel gear housing having a first and second bearing in registration with each other, and a third and fourth bearing in registration with each other, the shimming gage of the present invention comprises a first main housing which abuts against the first gear, and a bearing support which abuts against the second gear. A first gaging rod is received in registering apertures formed in the first bearing support and the first main housing and provides a means whereby the distance between reference points on the first gaging rod and the first main housing and between the first gaging rod and the first bearing support may be determined. Similarly, a second main housing abuts against the third bearing, a second bearing support abuts against the fourth bearing while a second gaging rod is received in registering apertures in the second main housing and the second bearing support and provides a means to measure the analogous distances between reference points on the second main housing, the second gaging rod and second bearing support.

More specifically, each gaging rod secured a central bore. A transverse gaging pin, which is secrued to each of the main housing, is received into the gaging rod central bore through a slot in the gaging rod so that the distance between the gaging pin and the main housing may be determined by measuring the distance from the end of the gaging rod to the gaging pin through the gaging rod central bore. This measurement in conjunction with the distance between the head of the gaging rod and the bearing support is sufficient to compute the shim dimensions as will be hereinafter described in greater detail.

BRIEF DESCRIPTION OF THE DRAWINGS

The bevel gear shimming gage of the present invention will be more clearly understood by reference to the following detailed description when read in conjunction with the accompanying drawing, wherein like reference characters refer to like parts throughout the several views, and in which:

FIG. 1 is a cross sectional view showing the shimming gage of the present invention assembled in a bevel gear housing;

FIG. 2 is a fragmentary cross sectional view taken substantially along line 2—2 in FIG. 1;

FIG. 3 is a cross sectional view taken substantially along line 3—3 in FIG. 1;

FIG. 4 is a fragmentary cross sectional veiw showing the intersection of the gaging rods of the shimming gage of the present invention and enlarged for clarity; and FIG. 5 is a diagrammatic view showing a bevel gear arrangement with shims determined by the shimming gage of the shimming gage of the present invention.

DETAILED DESCRIPTION OF THE PRESENT INVENTION

Referring first to FIG. 1, the bevel gear shimming gage 10 of the present invention is shown assembled in a bevel gear housing 12. The housing 12 is a typical construction and supports a first bearing 14 and a second bearing 16 in registration with each other which, for the prupose of description only, will be assumed to be intended to rotatably support a drive gear (not shown) when completely assembled. Similarly, a third bearing 18 and a fourth bearing 20, in registration with the third bearing 18, are provided within the gear housing 12 and are adapted to support a driven gear (not shown). The longitudinal axis of the bearings 14 and 16 intersect the longitudinal axis of the bearings 18 and 20 at point 22 so that the axes of rotation for the drive gear and driven gear intersect each other obliquely, although this is not necessary for the operation of the shimming gage 10 of the present invention.

The shimming gage 10 comprises two separate components, a drive gear shim gage 24 and a driven gear shim gage 26 which are similar in operation to each other. The drive gear gage 24 includes a main housing 28 which is generally cylindrical in shaped and which has a reduced diameter portion 30 received within the second bearing 16. As best shown in FIG. 2, a pin 13 carried by a member 17 fixed to the main housing 28 is received in a bore 15 in the bevel gear housing 12 to prevent rotation of the main housing 28 within the bevel gear housing 12.

Referring again to FIG. 1, a bearing support 32 is likewise generally cylindrical in shape and includes an enlarged diameter portion 34 thus forming an annular abutment surface 36 which abuts against the first bearing 14. A helical thrust spring 38 is provided between the inner axial face 40 of the bearing support 32 and an annular abutment surface 42 on the main housing 28; a reduced diameter portion 44 on the main housing 28 functions to retain the spring 38 to the main housing 28. The spring 38 is in a state of compression thereby forcing the surface 36 against the bearing 14 while simultaneously forcing the reduced diameter portion 30 of the main housing 20 into the aperture of the bearing 16.

An elongated gaging rod 46 having an axial bore 51 is received through registering apertures 48 and 50 in the bearing support 32 and the main housing 28, respectively. As best shown in FIGS. 1 and 3, a transverse gaging pin 54 is secured to the main housing 28 and extends through an axially elongated slot 52 and into the axial bore 51 of the rod 46 for a purpose to be hereinafter described.

Referring again to FIG. 1, a compressed helical gaging rod spring 56 abuts at one end against a surface 58 of the housing 28 and at its other end against a spring washer 60 which is secured to the gaging rod 46 by a retainer ring 62. The spring 56 thus urges the gaging rod 46 rightward as viewed in FIG. 1 towards the point 22. At its other end, the gaging rod 46 includes an enlarged diameter head portion 64 thus forming an annular abutment surface adapted to abut against the outwardly facing axial end 68 of the bearing support 34.

Thus the drive gear shim gage 24 basically comprises three components, namely the main housing 28, the bearing support 34 and the gaging rod 46 all of which are axially moveable relative to each other. However, the gaging pin 54 retains the gaging rod 46 to the main housing 28 while the annular abutment surface 66 of the gaging rod head portion 64 retains the bearing support 34 between the gaging rod head portion 64 and the main housing 28. Thus, when assembled, the drive gear shimming gage 24 is of a unitary construction.

Still referring to FIG. 1, the driven gear shimming gage 26 is similar in construvtion to the drive gear shimming gage 24 and includes a main housing 70 having an annular abutment surface 72 adapted to abut against the bearing 20. Likewise a bearing support 74 is provided with an annular abutment surface 76 adapted to abut against the bearing 18 and a helical thrust spring 78 is provided between the main housing 70 and the bearing support 74 to maintain an abutting engagement between the surfaces 72 and 76 with the bearings 20 and 18, respectively. A driven gear gaging rod 80 having an axial bore 82 is positioned through registering bores 84 and 86 in the bearing support 74 and the main housing 70. An elongated slot 88 in the gaging rod 80 within the main housing 70 permits a transverse gaging pin 90 secured to the main housing 70 to extend transversely into the gaging rod axial bore 82.

A gaging rod spring 92 abuts at one end against an annular surface 94 formed on the main housing 70 and at its other end agaist a spring washer 96 secured to the gaging rod 80 by a retainer 98. Like the drive gear shimming gage 24, the driven gear shimming gage 80 is provided with an enlarged head portion 100 which retains the bearing support 74 between the head portion 100 and the main housing 70 from the gaging rod 80 so that the driven gear shimming gage 26 is also of a unitary construction when assembled.

Each of the gaging rods 46 and 80 includes a chamfered end 102 and 104, respectively, as is best shown in FIG. 4. Preferrably both of the ends 102 and 104 are chamfered at an angle which is equal to 90° minus the intersection angle of the axis of the drive gear with the driven gear. Thus one edge of the chamfered end 104 of the gaging rod 80 flatly abuts against a horizontal surface 106 formed along the drive gear main housing 28. Similarly, one edge of the chamfered surface 102 of the drive gear gaging rod 26 flatly abuts against the side of the gaging rod 80. In this manner horizontal movement of the drive gear main housing 28, as viewed in the drawing, has no effect on the axial position of the drive gear gaging rod 46.

The component parts of the bevel gear shimming gage 10 of the present invention having been described, the operation of the shimming gage 10 will now be described. With reference to FIG. 1, the shimming gage 10 is positioned in the bevel gear housing 12 so that the main housings 28 and 70 and the bearing supports 34 and 74 abut against their respective bearings 14, 16, 18, and 20. The distance "A" between the abutment surface 66 of the drive gear gaging rod head 64 and the outwardly extending abutment surface 68 of the bearing support 34 is measured and recorded. Similarly, the distance "D" between the end 108 of the driven gear bearing support 74 is measured and recorded. A depth gage (not shown) is then inserted down the axial bores 51 and 82 of the gaging rods 46 and 80, respectively, to measure the distances between the gaging pins 54 and 90, and the respective transverse surface 112 and 108 of the gaging rod head portions 64 and 100.

Referring now to FIGS. 1 and 5 the measurement "A" and "B" effectively define the axial distance between the bearings 14 and 16 since the exact dimensions of the first main housing 28, the first bearing support 32 and the first gaging rod 46 are predetermined. Likewise, the position of the intersection point 22 of the bevel gear axes relative to the first gaging rod 46 is predetermined and unchanged by axial movement of the first main housing 28 as has been already described. Thus the measurements "A" and "B" in conjunction with the axial length "C" of the bevel drive gear permits computation of the required thickness of shims M and N. Analagously, the measurements "D"

and "E" and the axial length "F" of the driven bevel gear permits computation of the required thickness of shims K and L. The computations will now be described.

The axial length or thickness of the shim M is inversely proportional to the distance "A", i.e. the distance between the reference points on the bearing support 34 and the gaging rod 46. Thus a reduction in the measurement "A" is indicative that the shim dimensions for the bearing 14 must be increased since the bearing support 34 is shifted leftwardly towards the gaging rod head portion 64 reducing the size of measurement "A". Consequently the axial length of shim M is as follows: shim $M =$ constant $(K_1) -$ "$A$" wherein the value of the constant $K_1$) is dependant upon the construction of the drive gear shimming gage 24. Thus for example, when the measurement "A" equals the constant ($K_1$), no shim M is required.

The measurement B in effect provides a distance measurement between a reference point on the drive gear main housing 28 (i.e. the gaging pin 54) and a reference point on the gaging rod 46. The following formula provides the axial length or thickness of shim N: shim $N =$ constant $(K_2) +$ "$B$" $-$ "$M$" $-$ "$C$".

Thus, as the main housing 28 moves rightwardly, indicating that a larger shim N is required, the gaging pin 54 moves rightwardly along the elongated slot 52 in the gaging rod 46 thereby increasing the length of measurement B and proportionately increasing the necessary thickness of shim N. As before the constant ($K_2$) is dependant upon the construction and dimention of the individual shimming gage 24 while the dimension of the shim M must also be subtracted since this dimension has already been taken into account when determining the dimension of shim M. The measurement "C" (FIG. 5) is also preferably included in the computation in the dimension of shim N since due to manufacturing tolerances, the measurement "C" varies from one bevel gear to another. However, assuming the measurement C is constant from one bevel gear to another, the above formulas may be combined for shim N as follows: shim $N =$ constant $(K_2') + A + B$. The computation for the dimensions of shim K and shim L are precisely parallel to the calculations for shim M and shim N and are summarized as follows:

shim $K =$ constant $(K_3) - D$ shim $L =$ constant $(K_4) + E + K + F$

It can be thus seen that the bevel gear shimming gage 10 of the present invention provides a substantial advantage over the previously known shimming gages in that only one assembly of the shimming gage 10 in the bevel gear housing 12 is required to obtain the needed measurements for all four shims in the bevel gear arrangement. Thereafter all four required shims may be constructed without re-assembly of the shimming gage 10. Moreover the bevel gear shimming gage 10 of te present invention is not only less expensive in construction than the previously known shimming gages, but also the operation of the shimming gage 10 is simpler and faster than previously known devices.

Having thus described my inventon, many modifications thereto will become apparent to those skilled in the art to which it pertains without deviating from the spirit of the invention as defined by the scope of the appended claims.

I claim:
1. A bevel gear shimming gage for use in conjunction with a bevel gear housing having a first and second stationary bearing in registration with each other, and a third and fourth stationary bearing in registration with each other, said shimming gage comprising:
   a first main housing having a bore therein and having a portion adapted to abut against said first bearing,
   a first bearing support having a bore therein and having a portion adapted to abut against said second bearing,
   a second main housing having a bore therein and having a portion adapted to abut against said third bearing,
   a second bearing support having a bore therein and having a portion adapted to abut against said fourth bearing,
   first gaging rod means positioned through said first main housing and said first bearing support bores for defining the distance between reference points on said gaging rod means and said first bearing support and between reference points on said gaging rod means and said first main housing, and
   second gaging rod means positioned through said second main housng and said second bearing support bores for defining the distance between reference points on said second gaging rod means and said second bearing support and between reference points on said gaging rod means and said second main housing.
2. The invention as defined in claim 1 wherein said fist main housing, said first bearing support, and said first gaging rod means assume an axial position independently of each other.
3. The invention as defined in claim 2 wherein said second main housing, said second bearing support, and said second gaging rod means assume an axial position independantly of each other.
4. The invention as defined in claim 1 and including first resilient means in a state of compression between said first main housing and said first bearing support for retaining the abutting engagement of said first main housing and said first bearing support against their respective bearings.
5. The invention as defined in claim 4, and including second resilient means in a state of compression between said second main housing and said second bearing support for retaining the abutting engagement of said second main housing and said second bearing support against their respective bearings.
6. The invention as defined in claim 5 wherein both of said first and second resilient means are helical coil springs.
7. The invention as defined in claim 1 including means for urging one end of said second gaging rod into abutment with said first main housing, and a gaging pin carried by said second main housing and in registry with a longitudinally elongated slot in said second gaging rod whereby said gaging pin extends into the interior of said second gaging rod axial bore.
8. The invention as defined in claim 7 including, means for urging said first gaging rod into abutment with said second gaging rod, and a gaging pin carried by said first main housing and in registry with a longitudinally elongated slot in said first gaging rod whereby said last mentioned gaging pin extends into the interior of said first gaging rod axial bore.

* * * * *

UNITED STATES PATENT AND TRADEMARK OFFICE
CERTIFICATE OF CORRECTION

PATENT NO. : 4,017,979
DATED : April 19, 1977
INVENTOR(S) : Herman N. Lenz

It is certified that error appears in the above-identified patent and that said Letters Patent are hereby corrected as shown below:

Col. 2, line 25, delete "secured" and insert --includes--
line 26, delete "secrued" and insert --secured--
line 58, delete "of the shimming gage"
line 68, delete "prupose" and insert --purpose--

Col. 3, line 15, delete "shaped" and insert --shape--
line 52, after "surface" insert --66--
line 66, delete "construvtion" and insert --construction--

Col. 4, line 10, after "70" insert -- respectively --

Col. 5, line 15 "K,)" should be --(K,);
line 31, delete "dimention" and insert --dimension--;
line 49, delete "+" last two occurrences and insert -- - --;
line 59, "to" should be --the--

Col. 6, line 32, delete "fist" and insert --first--

Signed and Sealed this second Day of August 1977

[SEAL]

Attest:

RUTH C. MASON
Attesting Officer

C. MARSHALL DANN
Commissioner of Patents and Trademarks